US012646452B2

(12) United States Patent
Woo et al.

(10) Patent No.: US 12,646,452 B2
(45) Date of Patent: Jun. 2, 2026

(54) PIXEL CIRCUIT AND DISPLAY APPARATUS INCLUDING THE SAME

(71) Applicant: Samsung Display Co., LTD., Yongin-si (KR)

(72) Inventors: Minkyu Woo, Yongin-si (KR); Jangmi Kang, Yongin-si (KR); Byungchang Yu, Yongin-si (KR); Geunho Lee, Yongin-si (KR); Kyunghoon Chung, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/034,415

(22) Filed: Jan. 22, 2025

(65) Prior Publication Data

US 2025/0336337 A1 Oct. 30, 2025

(30) Foreign Application Priority Data

Apr. 30, 2024 (KR) ........................ 10-2024-0057588

(51) Int. Cl.
*G09G 3/32* (2016.01)

(52) U.S. Cl.
CPC ....... *G09G 3/32* (2013.01); *G09G 2300/0819* (2013.01); *G09G 2300/0852* (2013.01); *G09G 2310/08* (2013.01); *G09G 2330/021* (2013.01)

(58) Field of Classification Search
None
See application file for complete search history.

(56) References Cited

U.S. PATENT DOCUMENTS

| | | | | |
|---|---|---|---|---|
| 2009/0021536 | A1* | 1/2009 | Abe | G09G 3/325 345/77 |
| 2018/0301080 | A1* | 10/2018 | Shigeta | G09G 3/32 |
| 2021/0312856 | A1* | 10/2021 | Jeong | G09G 5/18 |
| 2022/0358878 | A1* | 11/2022 | Kim | G09G 3/3258 |
| 2024/0135868 | A1* | 4/2024 | Lee | G09G 3/2081 |
| 2024/0203323 | A1* | 6/2024 | Woo | G09G 3/32 |
| 2024/0363055 | A1* | 10/2024 | Zhang | G09G 3/32 |
| 2025/0037660 | A1* | 1/2025 | Liao | G09G 3/3233 |
| 2025/0104614 | A1* | 3/2025 | Kim | G09G 3/32 |

FOREIGN PATENT DOCUMENTS

| | | |
|---|---|---|
| CN | 115798399 | 3/2023 |
| KR | 10-2022-0052265 | 4/2022 |
| KR | 10-2023-0011844 | 1/2023 |

* cited by examiner

*Primary Examiner* — Dorothy Harris
(74) *Attorney, Agent, or Firm* — Womble Bond Dickinson (US) LLP

(57) ABSTRACT

A display apparatus includes a gate driver for applying gate signals, a display panel including a pixel circuit including a first transistor for applying a driving current to a second node in response to a voltage of first node, a second transistor configured to connect the first node and the second node, a third transistor for applying a first power voltage, which is changed during a frame period in which the pixel circuit is driven, to the first node, a fourth transistor for applying a data voltage to the third node, a fifth transistor for applying an initialization voltage to the first node, a sweep capacitor for applying a sweep signal to the third node, and a light-emitting element including an anode connected to the second node, and a cathode for receiving a second power voltage, and a data driver for applying a data voltage to the display panel.

22 Claims, 9 Drawing Sheets

PIXEL CIRCUIT AND DISPLAY APPARATUS INCLUDING THE SAME

CROSS-REFERENCE TO RELATED APPLICATION

The present application claims priority to, and the benefit of, Korean Patent Application No. 10-2024-0057588, filed on Apr. 30, 2024, in the Korean Intellectual Property Office, the entire disclosure of which is incorporated herein by reference.

BACKGROUND

1. Field

Embodiments of the present disclosure relate to a pixel of which an integration is improved, and a display apparatus including the same.

2. Description of the Related Art

Generally, a display apparatus includes a display panel and a display panel driver. The display panel includes a plurality of gate lines, a plurality of data lines, a plurality of emission lines, and a plurality of pixels. The display panel driver includes a gate driver for providing a gate signal to the gate lines, a data driver for providing a data voltage to the data lines, an emission driver for providing an emission signal to the emission lines, and a driving controller for controlling the gate driver, the data driver, and the emission driver.

A conventional pixel circuit driven by pulse width modulation method, and for performing internal compensation of a threshold voltage, may include 19 or more transistors and 3 or more capacitors, so that it may be difficult to apply it to an ultra-high-resolution display device due to limitations in integration.

SUMMARY

Embodiments of the present disclosure provide a pixel circuit which is driven by pulse width modulation, which performs internal compensation of threshold voltage, and which includes a small number of transistors, applicable to ultra-high resolution display devices Embodiments of the present disclosure also provide a display apparatus including the pixel circuit.

According to embodiments, a pixel circuit may include a first transistor configured to apply a driving current to a second node in response to a voltage of first node, a second transistor configured to connect the first node and the second node in response to a first write gate signal, a third transistor configured to apply a first power voltage, which is configured to be changed during a frame period in which the pixel circuit is driven, to the first node in response to a voltage of a third node, a fourth transistor configured to apply a data voltage to the third node in response to a second write gate signal, a fifth transistor configured to apply an initialization voltage to the first node in response to an initialization gate signal, a sweep capacitor configured to apply a sweep signal to the third node, and a light-emitting element including an anode connected to the second node, and a cathode for receiving a second power voltage.

The first transistor may include a control electrode connected to the first node, a first electrode for receiving the first power voltage, and a second electrode connected to the second node.

The second power voltage may be configured to be changed during the frame period.

In a first period of the frame period, the first power voltage may be configured to have a first variable low voltage, the second power voltage may be configured to have a second variable high voltage, the initialization gate signal may be configured to have an activation level, and the fifth transistor may be configured to be turned on.

In the first period, the first transistor may be configured to be turned off.

In a second period following the first period, the first power voltage may be configured to have a first variable middle voltage that is higher than the first variable low voltage, the first write gate signal may be configured to have an activation level, and the second transistor may be configured to be turned on.

In the second period, the first transistor may be configured to be turned on.

In a third period following the second period, the first power voltage may be configured to have a first variable high voltage that is higher than the first variable middle voltage, the second write gate signal may be configured to have an activation level, and the fourth transistor may be configured to be turned on.

In a fourth period following the third period, the second power voltage may be configured to have the second variable high voltage, and a voltage of the sweep signal may be configured to be gradually decreased.

In the fourth period, the first transistor may be configured to be turned off.

In a fifth period following the third period, the second power voltage may be configured to have a second variable low voltage that is lower than the second variable high voltage, a voltage of the sweep signal may be configured to be gradually decreased, and the first transistor may be configured to be turned on.

In a sixth period following the fifth period, the voltage of the sweep signal may be configured to be gradually decreased, the third transistor may be configured to be turned, on and the first transistor may be configured to be turned off.

The pixel circuit may further include an emission capacitor including a first electrode connected to the second node, and a second electrode for receiving the second power voltage, and a storage capacitor including a first electrode for receiving a third power voltage, and a second electrode connected to the first node.

The first transistor may include a control electrode connected to the first node, a first electrode for receiving the first power voltage, and a second electrode connected to the second node, wherein the second transistor includes a control electrode for receiving the first write gate signal, a first electrode connected to the second node, and a second electrode connected to the first node, wherein the third transistor includes a control electrode connected to the third node, a first electrode for receiving the first power voltage, and a second electrode connected to the first node, wherein the fourth transistor includes a control electrode for receiving the second write gate signal, a first electrode for receiving the data voltage, and a second electrode connected to the third node, and wherein the fifth transistor includes a control electrode for receiving the initialization gate signal, a first electrode for receiving the initialization voltage, and a second electrode connected to the first node.

The first transistor, the second transistor, the third transistor, the fourth transistor, and the fifth transistor may include P-type transistors.

According to embodiments, a pixel circuit may include a first transistor configured to apply a driving current to a second node in response to a voltage of a first node, a second transistor configured to connect the first node and the second node in response to a first write gate signal, a third transistor configured to apply a first power voltage, which is configured to be changed during a frame period in which the pixel circuit is driven, to the first node in response to a voltage of a third node, a fourth transistor configured to apply a data voltage to the third node in response to a second write gate signal, a fifth transistor configured to apply an initialization voltage to the first node in response to an initialization gate signal, a sweep capacitor configured to apply a sweep signal to the third node, and a light-emitting element including an anode for receiving a second power voltage, and a cathode connected to the second node.

The first transistor, the second transistor, the third transistor, the fourth transistor, and the fifth transistor may include N-type transistors.

The frame period may include a first period, a second period, a third period, a fourth period, and a fifth period, wherein, in the first period, the first power voltage is configured to have a first variable high voltage, the second power voltage is configured to have a second variable low voltage, and the initialization gate signal is configured to have an activation level, wherein, in the second period, the first power voltage has a first variable middle voltage that is lower than the first variable high voltage, and the first write gate signal is configured have an activation level, wherein, in the third period, the first power voltage is configured have a first variable low voltage that is lower than the first variable middle voltage, and the second write gate signal is configured have an activation level, wherein, in the fourth period, the first power voltage is configured have the first variable low voltage, and a voltage of the sweep signal is configured to be gradually increased, and wherein, in the fifth period, the second power voltage is configured have a second variable high voltage that is higher than the second variable low voltage, and the voltage of the sweep signal is configured to be gradually increased.

According to embodiments, a display apparatus may include a gate driver configured to apply an initialization gate signal, a first write gate signal, and a second write gate signal, a display panel including a pixel circuit including a first transistor configured to apply a driving current to a second node in response to a voltage of first node, a second transistor configured to connect the first node and the second node in response to the first write gate signal, a third transistor configured to apply a first power voltage, which is configured to be changed during a frame period in which the pixel circuit is driven, to the first node in response to a voltage of a third node, a fourth transistor configured to apply a data voltage to the third node in response to the second write gate signal, a fifth transistor configured to apply an initialization voltage to the first node in response to the initialization gate signal, a sweep capacitor configured to apply a sweep signal to the third node, and a light-emitting element including an anode connected to the second node, and a cathode for receiving a second power voltage, and a data driver configured to apply a data voltage to the display panel.

The frame period may include a first period, a second period, a third period, a fourth period, and a fifth period, wherein, in the first period, the first power voltage is configured have a first variable low voltage, the second power voltage is configured have a second variable high voltage, and the initialization gate signal is configured have an activation level, wherein, in the second period following the first period, the first power voltage is configured have a first variable middle voltage that is higher than the first variable low voltage, and the first write gate signal is configured have an activation level, wherein, in the third period following the second period, the first power voltage is configured have a first variable high voltage that is higher than the first variable middle voltage, and the second write gate signal is configured have an activation level, wherein, in the fourth period following the third period, the second power voltage is configured have the second variable high voltage, and a voltage of the sweep signal is configured to be gradually decreased, and wherein, in the fifth period following the fourth period, the second power voltage is configured have a second variable low voltage that is lower than the second variable high voltage, and the voltage of the sweep signal is configured to be gradually decreased.

According to embodiments, an electronic device may include a display apparatus including a gate driver configured to apply an initialization gate signal, a first write gate signal, and a second write gate signal, a display panel including a pixel circuit including a first transistor configured to apply a driving current to a second node in response to a voltage of first node, a second transistor configured to connect the first node and the second node in response to the first write gate signal, a third transistor configured to apply a first power voltage, which is configured to be changed during a frame period in which the pixel circuit is driven, to the first node in response to a voltage of a third node, a fourth transistor configured to apply a data voltage to the third node in response to the second write gate signal, a fifth transistor configured to apply an initialization voltage to the first node in response to the initialization gate signal, a sweep capacitor configured to apply a sweep signal to the third node, and a light-emitting element including an anode connected to the second node, and a cathode for receiving a second power voltage, and a data driver configured to apply a data voltage to the display panel.

The electronic device may include a smartphone, a television, a monitor, a tablet, an electric vehicle, a mobile phone, a tablet personal computer (PC), a mobile communication terminal, an electronic notebook, an electronic book, a portable multimedia player (PMP), a navigation device, an ultra-mobile PC (UMPC), a laptop computer, a billboard, an Internet of Things (IoT) device, a smartwatch, a watch phone, or a head-mounted display (HMD).

As described above, according to a pixel circuit and a display apparatus including the same, the pixel circuit may include five transistors and two capacitors. The pixel circuit may be driven by pulse width modulation, may perform an internal compensation of threshold voltage, and may include a small number of transistors compared with conventional pixel circuit, so that the pixel circuit may have a high integration.

Additionally, the first power voltage applied to the pixel circuit may have the first variable low voltage, the first variable middle voltage, or the first variable high voltage. The second power voltage applied to the pixel circuit may have the second variable low voltage or the second variable high voltage. Because the first power voltage and the second power voltage may be changed, a power consumption of the display apparatus may be reduced.

Additionally, because the first power voltage and the second power voltage may be changed, an emission reliability and an emission stability of the pixel circuit may be further improved.

BRIEF DESCRIPTION OF THE DRAWINGS

Illustrative, non-limiting embodiments will be more clearly understood from the following detailed description in conjunction with the accompanying drawings.

DETAILED DESCRIPTION

Figure 1:
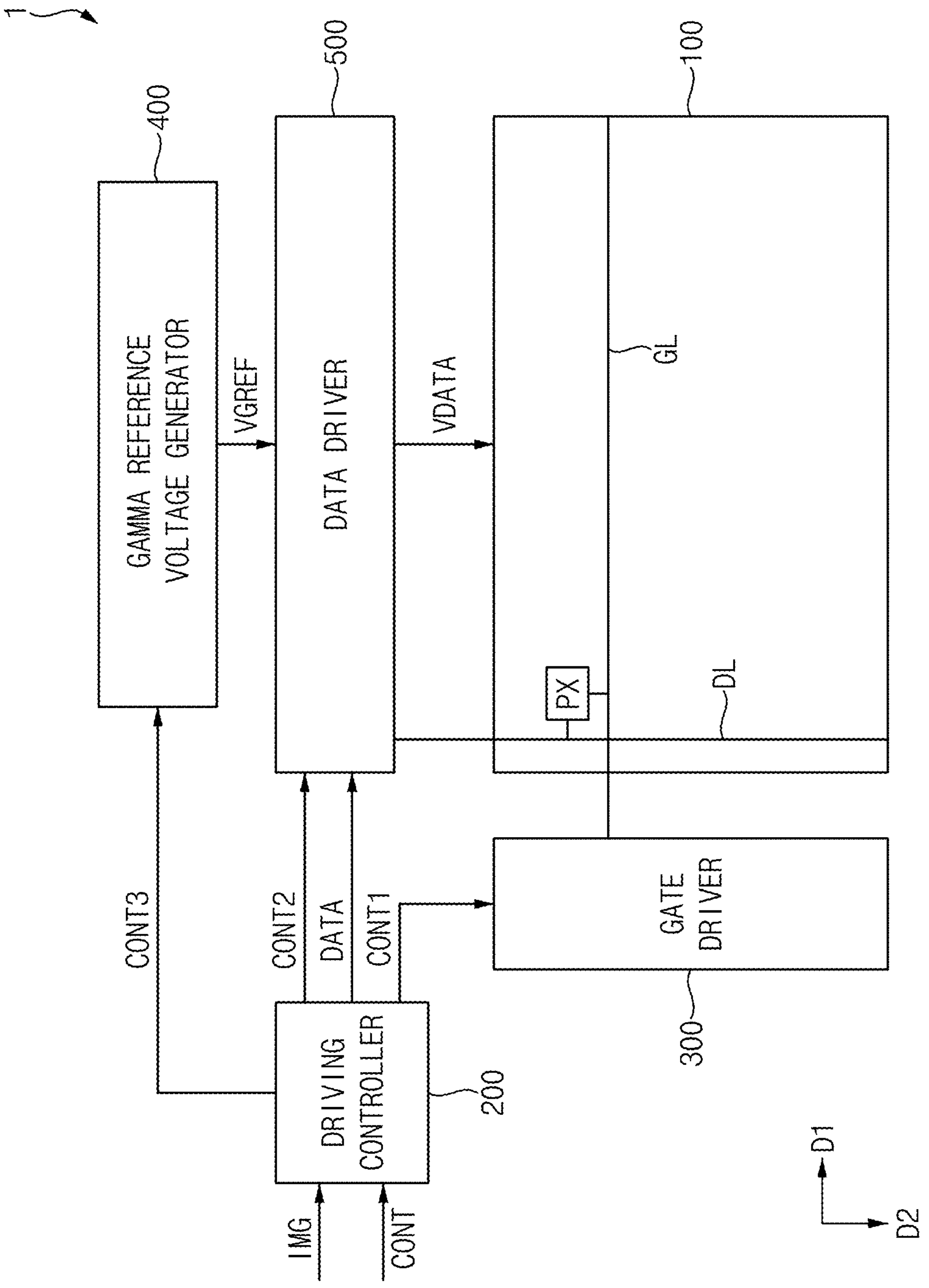
FIG. 1 is a block diagram illustrating a display apparatus according to embodiments of the present disclosure.

Aspects of some embodiments of the present disclosure and methods of accomplishing the same may be understood more readily by reference to the detailed description of embodiments and the accompanying drawings. The described embodiments are provided as examples so that this disclosure will be thorough and complete, and will fully convey the aspects of the present disclosure to those skilled in the art. Accordingly, processes, elements, and techniques that are redundant, that are unrelated or irrelevant to the description of the embodiments, or that are not necessary to those having ordinary skill in the art for a complete understanding of the aspects of the present disclosure may be omitted. Unless otherwise noted, like reference numerals, characters, or combinations thereof denote like elements throughout the attached drawings and the written description, and thus, repeated descriptions thereof may be omitted.

The described embodiments may have various modifications and may be embodied in different forms, and should not be construed as being limited to only the illustrated embodiments herein. The use of "can," "may," or "may not" in describing an embodiment corresponds to one or more embodiments of the present disclosure.

A person of ordinary skill in the art would appreciate, in view of the present disclosure in its entirety, that each suitable feature of the various embodiments of the present disclosure may be combined or combined with each other, partially or entirely, and may be technically interlocked and operated in various suitable ways, and each embodiment may be implemented independently of each other or in conjunction with each other in any suitable manner unless otherwise stated or implied.

In the drawings, the relative sizes of elements, layers, and regions may be exaggerated for clarity and/or descriptive purposes. In other words, because the sizes and thicknesses of elements in the drawings are arbitrarily illustrated for convenience of description, the disclosure is not limited thereto. Further, specific structural or functional descriptions disclosed herein are merely illustrative for the purpose of describing embodiments according to the concept of the present disclosure. Thus, embodiments disclosed herein should not be construed as limited to the illustrated shapes of elements, layers, or regions, but are to include deviations in shapes that result from, for instance, manufacturing.

It will be understood that when an element, layer, region, or component (e.g., an apparatus, a device, a circuit, a wire, an electrode, a terminal, a conductive film, etc.) is referred to as being "formed on," "on," "connected to," or "(operatively, functionally, or communicatively) coupled to" another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. In addition, this may collectively mean a direct or indirect coupling or connection and an integral or non-integral coupling or connection. For example, when a layer, region, or component is referred to as being "electrically connected" or "electrically coupled" to another layer, region, or component, it can be directly electrically connected or coupled to the other layer, region, and/or component or one or more intervening layers, regions, or components may be present. The one or more intervening components may include a switch, a transistor, a resistor, an inductor, a capacitor, a diode and/or the like. Accordingly, a connection is not limited to the connections illustrated in the drawings or the detailed description and may also include other types of connections. In describing embodiments, an expression of connection indicates electrical connection unless explicitly described to be direct connection, and "directly connected/directly coupled," or "directly on," refers to one component directly connecting or coupling another component, or being on another component, without an intermediate component.

In addition, in the present specification, when a portion of a layer, a film, an area, a plate, or the like is formed on another portion, a forming direction is not limited to an upper direction but includes forming the portion on a side surface or in a lower direction. On the contrary, when a portion of a layer, a film, an area, a plate, or the like is formed "under" another portion, this includes not only a case where the portion is "directly beneath" another portion but also a case where there is further another portion between the portion and another portion. Meanwhile, other expressions describing relationships between components, such as "between," "immediately between" or "adjacent to" and "directly adjacent to," may be construed similarly. It will be understood that when an element or layer is referred to as being "between" two elements or layers, it can be the only element or layer between the two elements or layers, or one or more intervening elements or layers may also be present.

For the purposes of this disclosure, expressions, such as "at least one of," or "any one of," or "one or more of" when preceding a list of elements, modify the entire list of elements and do not modify the individual elements of the list. For example, "at least one of X, Y, and Z," "at least one of X, Y, or Z," "at least one selected from the group consisting of X, Y, and Z," and "at least one selected from the group consisting of X, Y, or Z" may be construed as X only, Y only, Z only, any combination of two or more of X, Y, and Z, such as, for instance, XYZ, XYY, YZ, and ZZ, or any variation thereof. Similarly, the expressions "at least one of A and B" and "at least one of A or B" may include A, B, or A and B. As used herein, "or" generally means "and/or," and the term "and/or" includes any and all combinations of one or more of the associated listed items. For example, the expression "A and/or B" may include A, B, or A and B. Similarly, expressions, such as "at least one of," "a plurality of," "one of," and other prepositional phrases, when preceding a list of elements, modify the entire list of elements and do not modify the individual elements of the list. When "C to D" is stated, it means C or more and D or less, unless otherwise specified.

It will be understood that, although the terms "first," "second," "third," etc., may be used herein to describe various elements, components, regions, layers and/or sections, these elements, components, regions, layers and/or sections should not be limited by these terms. These terms do not correspond to a particular order, position, or superiority, and are used only used to distinguish one element, member, component, region, area, layer, section, or portion from another element, member, component, region, area, layer, section, or portion. Thus, a first element, component, region, layer or section described below could be termed a second element, component, region, layer or section, without departing from the spirit and scope of the present disclosure. The description of an element as a "first" element may not require or imply the presence of a second element or other elements. The terms "first," "second," etc. may also be used herein to differentiate different categories or sets of elements. For conciseness, the terms "first," "second," etc. may represent "first-category (or first-set)," "second-category (or second-set)," etc., respectively.

In the examples, the x-axis, the y-axis, and/or the z-axis are not limited to three axes of a rectangular coordinate system, and may be interpreted in a broader sense. For example, the x-axis, the y-axis, and the z-axis may be perpendicular to one another, or may represent different directions that are not perpendicular to one another. The same applies for first, second, and/or third directions.

The terminology used herein is for the purpose of describing embodiments only and is not intended to be limiting of the present disclosure. As used herein, the singular forms "a" and "an" are intended to include the plural forms as well, while the plural forms are also intended to include the singular forms, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

As used herein, the terms "substantially," "about," "approximately," and similar terms are used as terms of approximation and not as terms of degree, and are intended to account for the inherent deviations in measured or calculated values that would be recognized by those of ordinary skill in the art. For example, "substantially" may include a range of +/−5% of a corresponding value. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure." Furthermore, the expression "being the same" may mean "being substantially the same". In other words, the expression "being the same" may include a range that can be tolerated by those of ordinary skill in the art. The other expressions may also be expressions from which "substantially" has been omitted.

In some embodiments well-known structures and devices may be described in the accompanying drawings in relation to one or more functional blocks (e.g., block diagrams), units, and/or modules to avoid unnecessarily obscuring various embodiments. Those skilled in the art will understand that such block, unit, and/or module are/is physically implemented by a logic circuit, an individual component, a microprocessor, a hard wire circuit, a memory element, a line connection, and other electronic circuits. This may be formed using a semiconductor-based manufacturing technique or other manufacturing techniques. The block, unit, and/or module implemented by a microprocessor or other similar hardware may be programmed and controlled using software to perform various functions discussed herein, optionally may be driven by firmware and/or software. In addition, each block, unit, and/or module may be implemented by dedicated hardware, or a combination of dedicated hardware that performs some functions and a processor (for example, one or more programmed microprocessors and related circuits) that performs a function different from those of the dedicated hardware. In addition, in some embodiments, the block, unit, and/or module may be physically separated into two or more interact individual blocks, units, and/or modules without departing from the scope of the present disclosure. In addition, in some embodiments, the block, unit and/or module may be physically combined into more complex blocks, units, and/or modules without departing from the scope of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a block diagram illustrating a display apparatus 1 according to embodiments of the present disclosure.

Referring to FIG. 1, the display apparatus 1 includes a display panel 100 and a display panel driver. The display panel driver includes a driving controller 200, a gate emission driver 300, a gamma reference voltage generator 400, and a data driver 500. In one or more embodiments, the display panel driver may output a sweep signal, a first power voltage, and a second power voltage.

The display panel 100 has a display region on which an image is displayed and a peripheral region adjacent to the display region.

The display panel 100 includes a plurality of gate lines GL, a plurality of data lines DL, and a plurality of pixels electrically connected to the gate lines GL and the data lines DL. The gate lines GL may extend in a first direction D1, and the data lines DL may extend in a second direction D2 crossing the first direction D1.

The driving controller 200 receives input image data IMG and an input control signal CONT from an external apparatus. For example, the input image data IMG may include red image data, green image data, and blue image data. The input image data IMG may include white image data. The input image data IMG may include magenta image data, cyan image data, and yellow image data. The input control signal CONT may include a master clock signal and a data enable signal. The input control signal CONT may further include a vertical synchronizing signal and a horizontal synchronizing signal.

The driving controller 200 generates a first control signal CONT1, a second control signal CONT2, a third control signal CONT3, and a data signal DATA based on the input image data IMG and the input control signal CONT.

The driving controller 200 generates the first control signal CONT1 for controlling an operation of the gate emission driver 300 based on the input control signal CONT, and outputs the first control signal CONT1 to the gate emission driver 300. The first control signal CONT1 may include a vertical start signal and a gate clock signal.

The driving controller 200 generates the second control signal CONT2 for controlling an operation of the data driver 500 based on the input control signal CONT, and outputs the second control signal CONT2 to the data driver 500. The second control signal CONT2 may include a horizontal start signal and a load signal.

The driving controller 200 generates the data signal DATA based on the input image data IMG. The driving controller 200 outputs the data signal DATA to the data driver 500.

The driving controller 200 generates the third control signal CONT3 for controlling an operation of the gamma reference voltage generator 400 based on the input control signal CONT, and outputs the third control signal CONT3 to the gamma reference voltage generator 400.

The gate driver 300 generates gate signals driving the gate lines GL in response to the first control signal CONT1 received from the driving controller 200. The gate driver 300 may output the gate signals to the gate lines GL.

In one or more embodiments, the gate driver 300 may be located in the peripheral region. In one or more embodiments, the gate driver 300 may be integrated in the peripheral region. In one or more embodiments, the gate driver 300 may be located on the peripheral region.

The gamma reference voltage generator 400 generates a gamma reference voltage VGREF in response to the third control signal CONT3 received from the driving controller 200. The gamma reference voltage generator 400 provides the gamma reference voltage VGREF to the data driver 500. The gamma reference voltage VGREF has a value corresponding to a level of the data signal DATA.

In one or more embodiments, the gamma reference voltage generator 400 may be located in the driving controller 200, or in the data driver 500.

The data driver 500 receives the second control signal CONT2 and the data signal DATA from the driving controller 200, and receives the gamma reference voltages VGREF from the gamma reference voltage generator 400. The data driver 500 converts the data signal DATA into data voltages VDATA having an analog type using the gamma reference voltages VGREF. The data driver 500 outputs the data voltages VDATA to the data lines DL.

In one or more embodiments, the data driver 500 may be located in the peripheral region. In one or more embodiments, the data driver 500 may be integrated in the peripheral region.

The display apparatus 1 according to one or more embodiments is a device that displays a moving image and/or a still image. The display apparatus 1 may be applied to portable electronic devices, such as mobile phones, smartphones, tablet personal computers (PCs), mobile communication terminals, electronic notebooks, electronic books, portable multimedia players (PMPs), navigations, and ultra-mobile PCs (UMPCs). For example, the display apparatus 1 may be applied to a display unit of a television, a laptop computer, a monitor, a billboard, or the Internet of Things (IoT). Alternatively, in one or more embodiments, the display apparatus 1 may be applied to a smartwatch, a watch phone, and/or a head-mounted display device (HMD) for implementing virtual reality and/or augmented reality.

Figure 2:
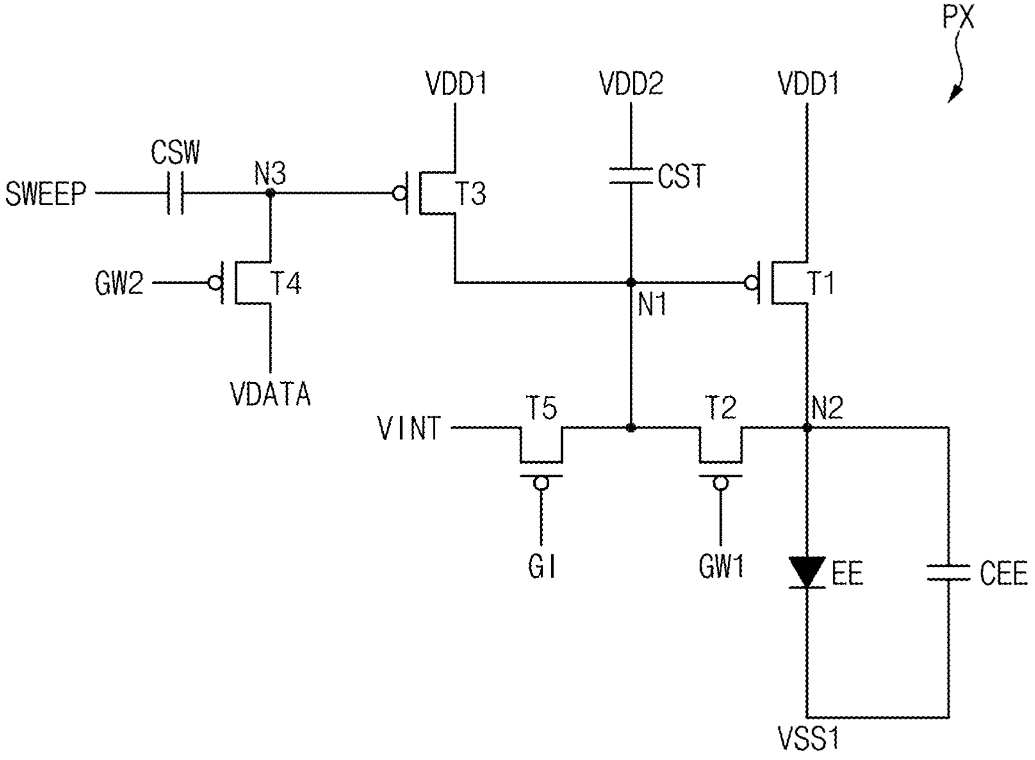
FIG. 2 is a circuit diagram illustrating an example of a pixel circuit included in a display apparatus of FIG. 1.

FIG. 2 is a circuit diagram illustrating an example of a pixel circuit PX included in a display apparatus 1 of FIG. 1.

Referring to FIG. 1 and FIG. 2, the pixel circuit PX may include a first transistor T1, a second transistor T2, a third transistor T3, a fourth transistor T4, a fifth transistor T5, a storage capacitor CST, a sweep capacitor CSW, and a light-emitting element EE. In one or more embodiments, the pixel circuit PX may further include a light-emitting element CEE.

The gate signal may include an initialization gate signal GI, a fist write gate signal GW1, and a second write gate signal GW2.

The first transistor T1 may include a control electrode connected to a first node N1, a first electrode for receiving a first power voltage VDD1, and a second electrode connected to a second node N2. The first transistor T1 may apply the first power voltage VDD1 to the second node N2 in response to a voltage of the first node N1. The first transistor T1 may generate a driving current based on the voltage of the first node N1. The first transistor T1 may output the driving current to the second node N2. For example, the first transistor T1 may be called as a driving transistor.

The second transistor T2 may include a control electrode for receiving the first write gate signal GW1, a first electrode connected to the second node N2, and a second electrode connected to the first node N1. The second transistor T2 may connect the second node N2 to the first node N1 in response to the first write gate signal GW1. The second transistor T2 may be diode-connecting the first transistor T1. For example, the second transistor T2 may be called as a compensation transistor.

The third transistor T3 may include a control electrode connected to a third node N3, a first electrode for receiving the first power voltage VDD1, and a second electrode connected to the first node N1. The third transistor T3 may apply the first power voltage VDD1 to the first node N1 in response to a voltage of the third node N3. For example, the third transistor T3 may be called as a sweep transistor.

The fourth transistor T4 may include a control electrode for receiving the second write gate signal GW2, a first electrode for receiving the data voltage VDATA, and a second electrode connected to the third node N3. The fourth transistor T4 may apply the data voltage VDATA to the third node N3 in response to the second write gate signal GW2. For example, the fourth transistor T4 may be called as a write transistor.

The fifth transistor T5 may include a control electrode for receiving the initialization gate signal GI, a first electrode for receiving an initialization voltage VINT, and a second electrode connected to the first node N1. The fifth transistor T5 may apply the initialization voltage VINT to the first node N1 in response to the initialization gate signal GI. For example, the fifth transistor T5 may be called as an initialization transistor.

The storage capacitor CST may include a first electrode for receiving a third power voltage VDD2, and a second electrode connected to the first node N1. The storage capacitor CST may store the voltage of the first node N1. For example, the third power voltage VDD2 may be a DC power voltage.

The sweep capacitor CSW may include a first electrode for receiving the sweep signal SWEEP, and a second electrode connected to the third node N3. The sweep capacitor CSW may apply the sweep signal SWEEP to the third node N3. For example, the sweep capacitor may couple a change of the sweep signal SWEEP, and may apply a coupling voltage to the third node N3.

The light-emitting element EE may include an anode connected to the second node N2 and a cathode for receiving a second power voltage VSS1. The light-emitting element EE may emit light based on the driving current.

In one or more embodiments, the light-emitting element capacitor CEE may include a first electrode connected to the second node N2, and a second electrode for receiving the second power voltage VSS1. The light-emitting element capacitor may be improving a black characteristic of the pixel circuit PX.

The first to fifth transistors T1, T2, T3, T4, and T5 may be P-type transistors, for example.

Figure 3:
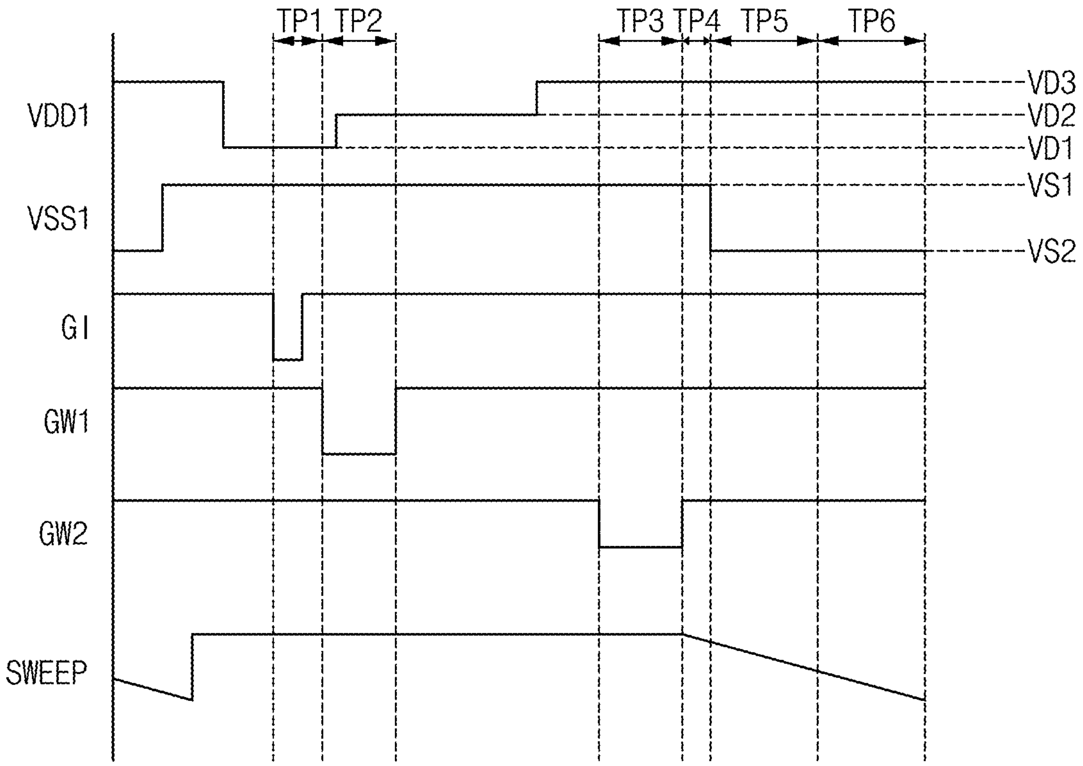
FIG. 3 is a timing diagram illustrating a timing of input signals applied to a pixel circuit of FIG. 2.

FIG. 3 is a timing diagram illustrating a timing of input signals applied to a pixel circuit PX of FIG. 2.

Referring to FIG. 3, a frame period in which the pixel circuit PX is driven may include a first period TP1, a second period TP2, a third period TP3, a fourth period TP4, a fifth period TP5, and a sixth period TP6.

The first power voltage VDD1 may have a first variable low voltage VD1, a first variable middle voltage VD2, or a first variable high voltage VD3. The second power voltage VSS1 may have a second variable low voltage VS1, a second variable middle voltage VS2, or a second variable high voltage VS3. The first variable low voltage VD1 may be lower than the first variable middle voltage VD2. The first variable high voltage VD3 may be higher than the first variable middle voltage VD2. The second variable low voltage VS2 may be lower than the second variable high voltage VS1.

Because the first power voltage VDD1 and the second power voltage VSS1 may be changed, a power consumption of the display apparatus 1 may be reduced.

An activation level of the initialization gate signal GI may be a low level. An inactivation level of the initialization gate signal GI may be a high level that is higher than the low level. An activation level of the first write gate signal GW1 may be a low level. An inactivation level of the first write gate signal GW1 may be a high level that is higher than the low level. An activation level of the second write gate signal GW2 may be a low level. An inactivation level of the second write gate signal GW2 may be a high level that is higher than the low level.

Figure 4:
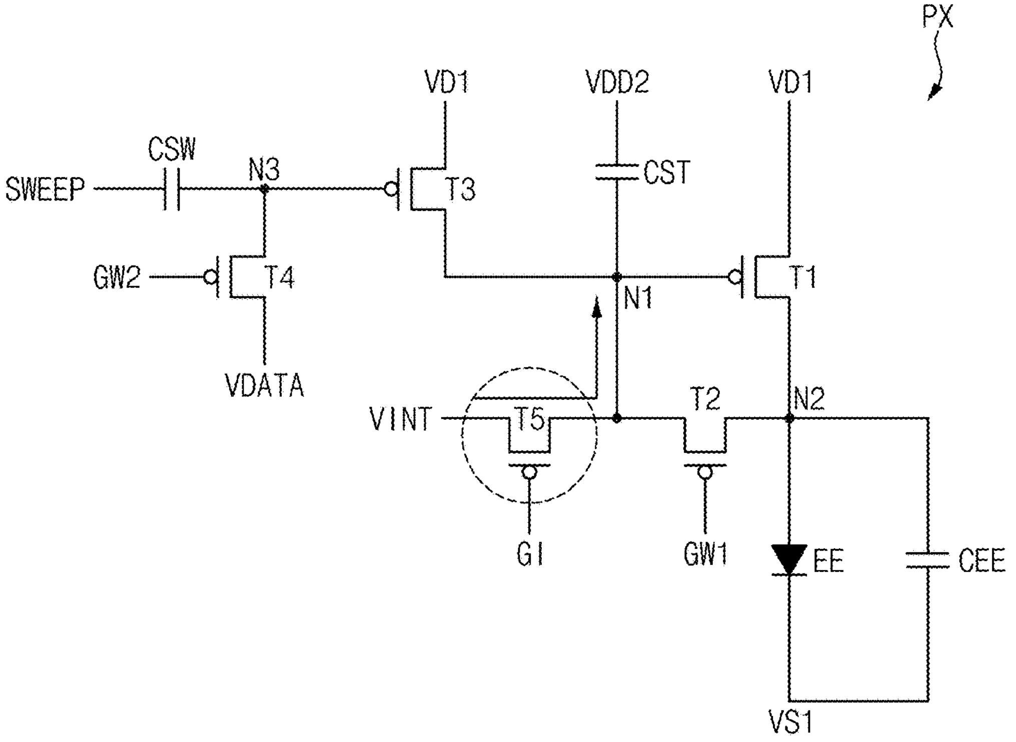
FIG. 4 is a circuit diagram illustrating an operation of the pixel circuit of FIG. 2 in a first period of FIG. 3.

FIG. 4 is a circuit diagram illustrating an operation of the pixel circuit PX of FIG. 2 in a first period TP1 of FIG. 3.

Referring to FIG. 3 and FIG. 4, in the first period TP1, the first power voltage VDD1 may have the first variable low voltage VD1, the second power voltage VSS1 may have the second variable high voltage VS1, the initialization gate signal GI may have an activation level, the first write gate signal GW1 may have an inactivation level, the second write gate signal GW2 may have an inactivation level, and the sweep signal SWEEP may have a first sweep level.

In one or more embodiments, the initialization gate signal GI may be a global signal. The global may refer to as a concurrent or substantially simultaneous signal having a same timing regardless of pixel-rows. For example, the global signal may have a same timing for at least two pixel-rows. In one or more embodiments, the first write gate signal GW1 may be the global signal.

In one or more embodiments, the second write gate signal GW2 may be a progressive signal having different timing for each pixel-row. For example, the progressive signal may have different timing for at least two pixel-rows.

In the first period TP1, the fifth transistor T5 may be turned on in response to the initialization gate signal GI. Because the fifth transistor T5 may be turned on, the initialization voltage VINT may be applied to the first node N1. The first node N1 may be initialized to the initialization voltage VINT.

In the first period TP1, the first power voltage VDD1 may have the first variable low voltage VD1. Accordingly, although the initialization voltage VINT may be applied to the first node N1, the first transistor T1 may be turned off. Because the first transistor T1 may be turned off in the first period TP1, an emission reliability of the pixel circuit PX may be improved. For example, the first period TP1 may be called as an initialization period.

Because the second power voltage VSS1 may have the second variable high voltage VS1 in the first period TP1, the cathode of the light-emitting element EE may receive the second variable high voltage VS1. Accordingly, a turned off state of the light-emitting element EE may be maintained stably.

Figure 5:
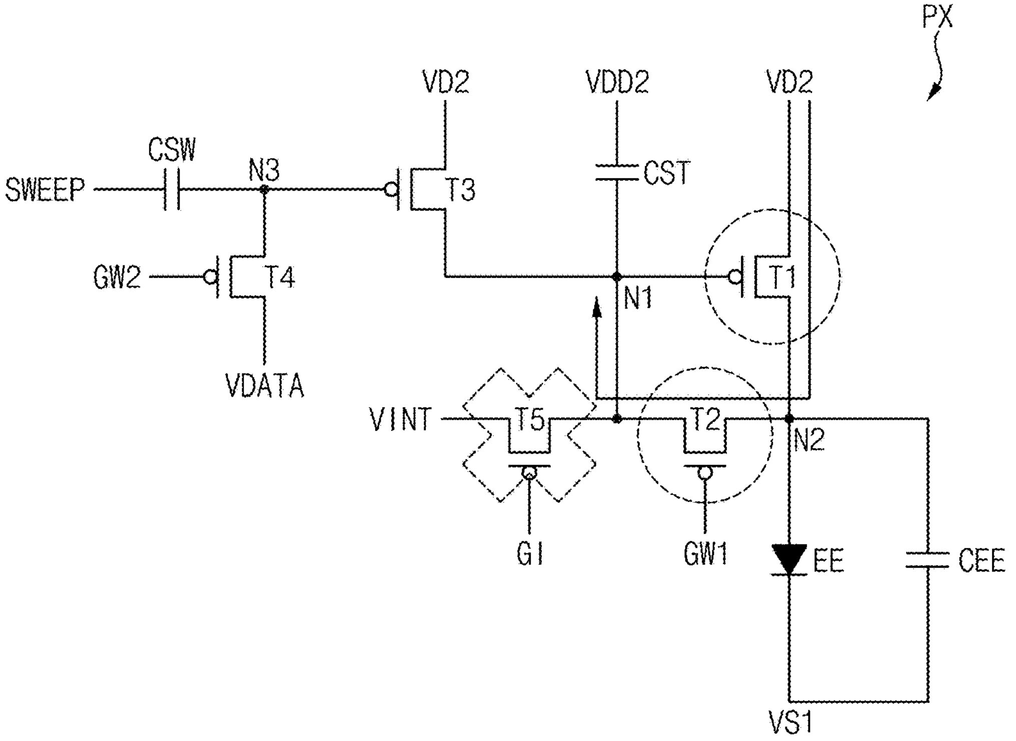
FIG. 5 is a circuit diagram illustrating an operation of the pixel circuit of FIG. 2 in a second period of FIG. 3.

FIG. 5 is a circuit diagram illustrating an operation of the pixel circuit PX of FIG. 2 in a second period TP2 of FIG. 3.

Referring to FIG. 3 and FIG. 5, in the second period TP2, the first power voltage VDD1 may have the first variable middle voltage VD2, the second power voltage VSS1 may have the second variable high voltage VS1, the initialization gate signal GI may have an inactivation level, the first write gate signal GW1 may have an activation level, the second write gate signal GW2 may have an inactivation level, and the sweep signal SWEEP may have a first sweep level.

In the second period TP2, the first power voltage VDD1 may have the first variable middle voltage VD2. Because the first power voltage VDD1 may have the first variable middle voltage VD2, the first transistor T1 may be turned on. The second transistor T2 may be turned on in response to the first write gate signal GW1. Accordingly, the first node N1 and the second node N2 may be connected. Through a path of the first transistor T1 and the second transistor T2, the first variable middle voltage VD2 may be applied to the first node N1. Accordingly, a voltage which a threshold voltage of the first transistor T1 is compensated may be applied to the first node N1. For example, an operation which the compensated voltage is applied to the first node N1 may be called as a compensation operation.

Because the first power voltage VDD1 may have the first variable middle voltage VD2, compared with the first power voltage VDD1 having the first variable high voltage VD3, a power consumption of the display apparatus 1 may be reduced.

Figure 6:
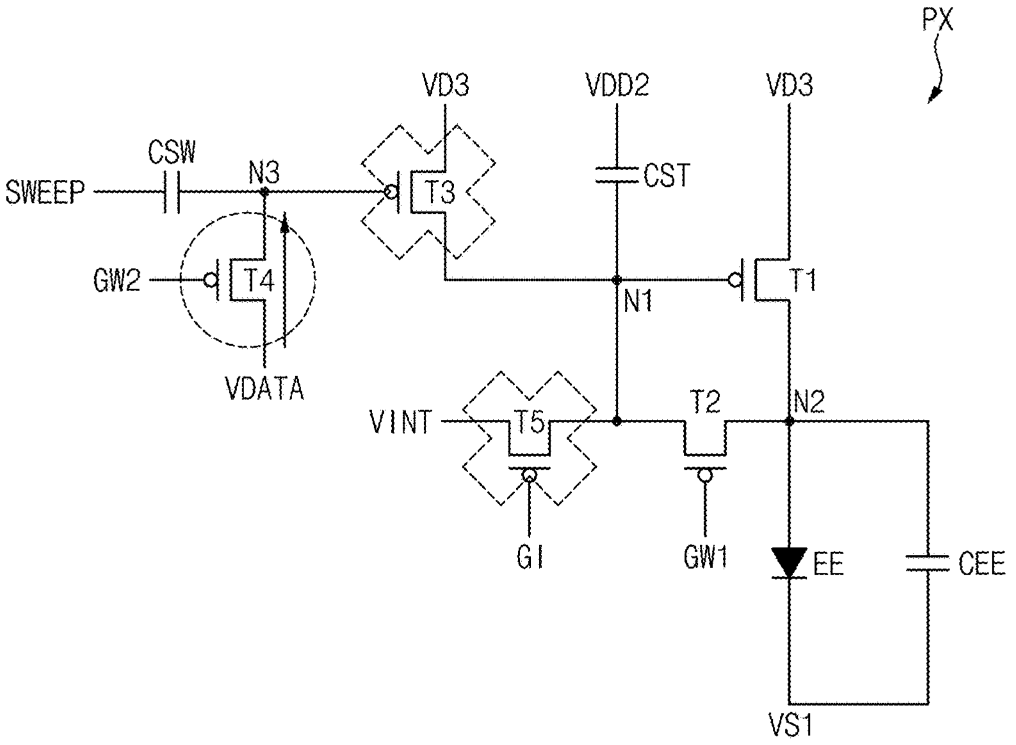
FIG. 6 is a circuit diagram illustrating an operation of the pixel circuit of FIG. 2 in a third period of FIG. 3.

FIG. 6 is a circuit diagram illustrating an operation of the pixel circuit PX of FIG. 2 in a third period TP3 of FIG. 3.

Referring to FIG. 3 and FIG. 6, in the third period TP3, the first power voltage VDD1 may have the first variable high voltage VD3, the second power voltage VSS1 may have the second variable high voltage VS1, the initialization gate signal GI may have an inactivation level, the first write gate signal GW1 may have an inactivation level, the second write gate signal GW2 may have an activation level, and the sweep signal SWEEP may have a first sweep level.

In the third period TP3, the fourth transistor T4 may be turned on in response to the second write gate signal GW2. Because the fourth transistor T4 may be turned on, the data voltage VDATA may be applied to the second node N2. In the third period TP3, a turned off state of the third transistor T3 may be maintained.

Figure 7:
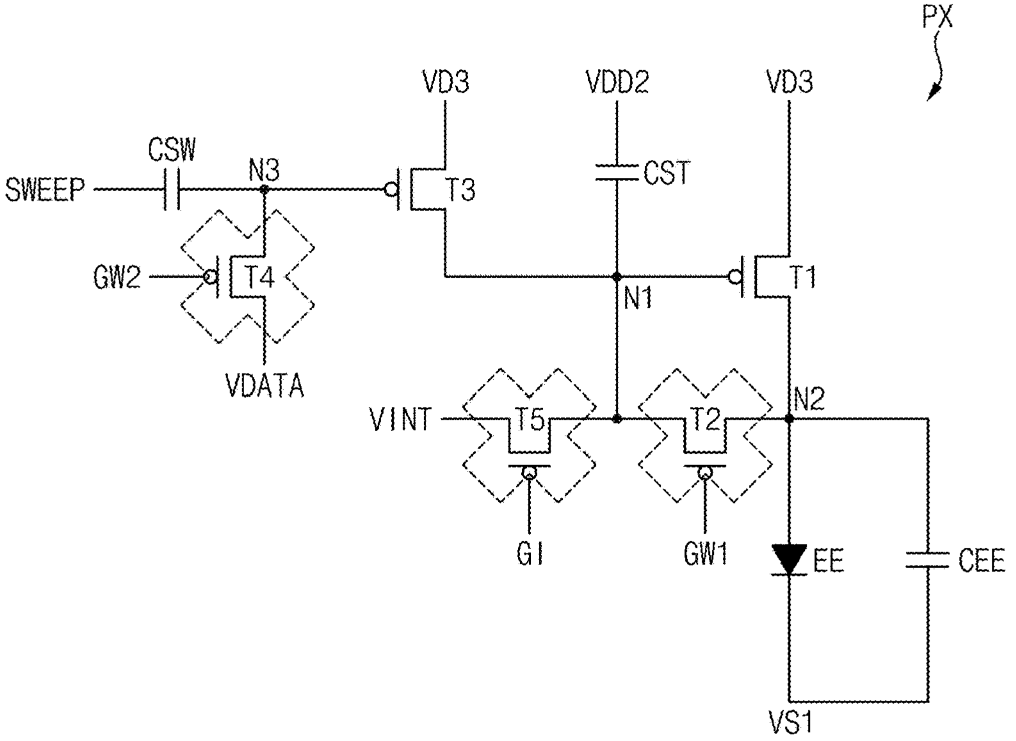
FIG. 7 is a circuit diagram illustrating an operation of the pixel circuit of FIG. 2 in a fourth period of FIG. 3.

FIG. 7 is a circuit diagram illustrating an operation of the pixel circuit PX of FIG. 2 in a fourth period TP4 of FIG. 3.

Referring to FIG. 3 and FIG. 7, in the fourth period TP4, the first power voltage VDD1 may have the first variable high voltage VD3, the second power voltage VSS1 may have the second variable high voltage VS1, the initialization gate signal GI may have an inactivation level, the first write gate signal GW1 may have an inactivation level, the second write gate signal GW2 may have an inactivation level, and the sweep signal SWEEP may be decreased from the first sweep level. For example, the sweep signal SWEEP may be gradually decreased from the first sweep level to a second sweep level that is lower than the first sweep level.

In the fourth period TP4, the second power voltage VSS1 may have the second variable high voltage VS1. Accordingly, the cathode of the light-emitting element EE may be applied to the second variable high voltage VS1. Because the cathode of the light-emitting element EE may receive the second variable high voltage VS1, the turned off state of the light-emitting element EE may be maintained. In the fourth period TP4, the sweep signal SWEEP may be gradually decreased from the first sweep level to the second sweep level.

For example, when the light-emitting element EE is to display as black, the first transistor T1 may to be turned off.

Because the second variable high voltage VS1 may be applied to the cathode of the light-emitting element EE, the turned off state of the light-emitting element EE may be maintained. When the data voltage VDATA corresponding to black is applied to the third node N3, a voltage of the sweep signal SWEEP may be gradually decreased, so that the third transistor T3 may be turned on in the fourth period TP4. Because the third transistor T3 may be turned on, the first variable high voltage VD3 may be applied to the first node N1. Because the first variable high voltage VD3 may be applied to the first node N1, the first transistor T1 may be turned off. Accordingly, the pixel circuit PX may stably display black in the fifth period TP5 following the fourth period TP4.

Figure 8:
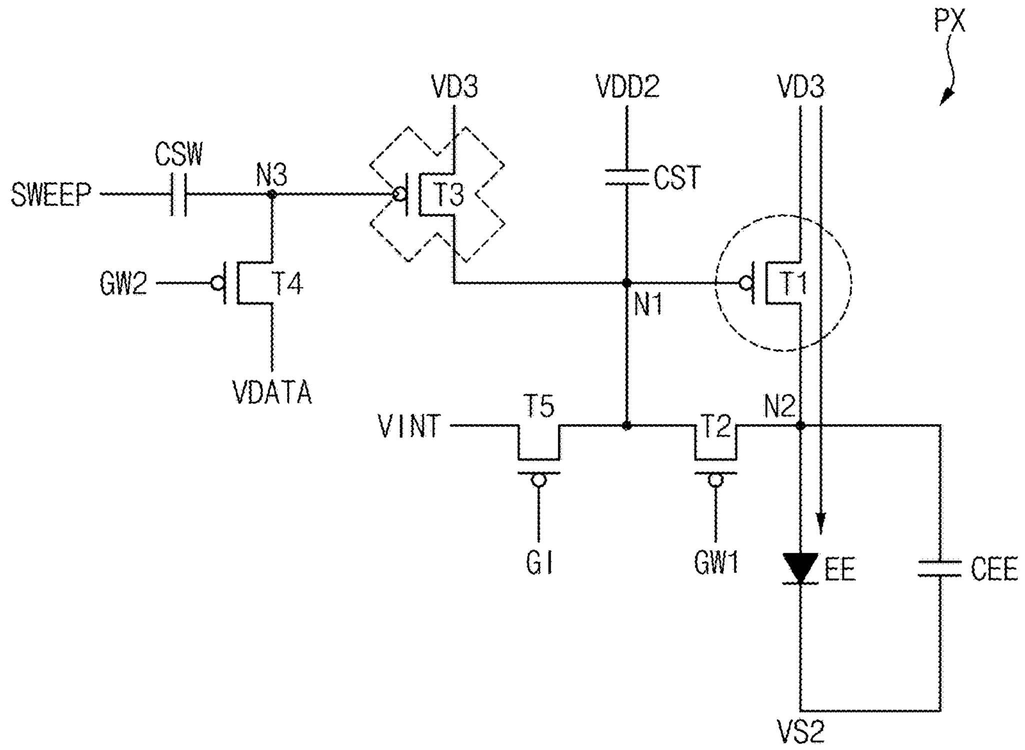
FIG. 8 is a circuit diagram illustrating an operation of the pixel circuit of FIG. 2 in a fifth period of FIG. 3.

FIG. 8 is a circuit diagram illustrating an operation of the pixel circuit PX of FIG. 2 in a fifth period TP5 of FIG. 3.

Referring to FIG. 3 and FIG. 8, in the fifth period TP5, the first power voltage VDD1 may have the first variable high voltage VD3, the second power voltage VSS1 may have the second variable low voltage VS2, the initialization gate signal GI may have an inactivation level, the first write gate signal GW1 may have an inactivation level, the second write gate signal GW2 may have an inactivation level, and the sweep signal SWEEP may be decreased to the second sweep level. For example, the sweep signal SWEEP may be gradually decreased to the second sweep level.

In the fifth period TP5, the second power voltage VSS1 may have the second variable low voltage VS2, the second variable low voltage VS2 may be applied to the cathode of the light-emitting element EE.

In the fifth period TP5, a voltage of the sweep signal SWEEP may be gradually decreased from the first sweep level to the low level. Accordingly, a voltage of the second node N2 may gradually decreased.

Figure 9:
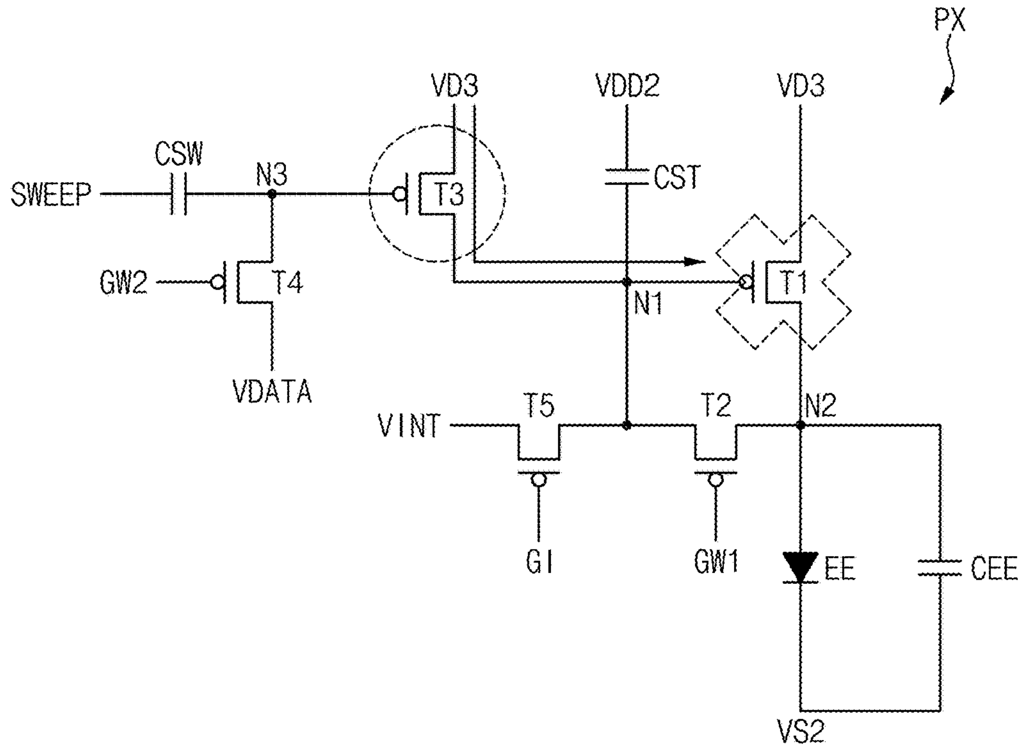
FIG. 9 is a circuit diagram illustrating an operation of the pixel circuit of FIG. 2 in a sixth period of FIG. 3.

FIG. 9 is a circuit diagram illustrating an operation of the pixel circuit PX of FIG. 2 in a sixth period TP6 of FIG. 3.

Referring to FIG. 3 and FIG. 9, in the sixth period TP6, the first power voltage VDD1 may have the first variable high voltage VD3, the second power voltage VSS1 may have the second variable low voltage VS2, the initialization gate signal GI may have an inactivation level, the first write gate signal GW1 may have an inactivation level, the second write gate signal GW2 may have an inactivation level, and the sweep signal SWEEP may be decreased to the second sweep level. For example, the sweep signal SWEEP may be gradually decreased to the second sweep level.

In the sixth period TP6, a voltage of the sweep signal SWEEP may be gradually decreased to the low level. In the sixth period TP6, a voltage of the third node N3 may be gradually decreased. When the voltage of the third node N3 is lower than a threshold voltage of the third transistor T3, the third transistor T3 may be turned on. When the third transistor T3 may be turned on, the first variable high voltage VD3 may be applied to the first node N1. When the first variable high voltage VD3 may be applied to the first node N1, the first transistor T1 may be turned off. When the first transistor T1 may be turned off, the light-emitting element EE may stop emission.

A timepoint at which the third transistor T3 is turned on may be determined based on the data voltage VDATA applied to the control electrode of the third transistor T3.

The pixel circuit PX may include five transistors and two capacitors. The pixel circuit PX may be driven by pulse width modulation, may perform an internal compensation of threshold voltage, and may include a small number of transistors compared with conventional pixel circuit, so that the pixel circuit PX may have a high integration.

Additionally, the first power voltage VDD1 may have the first variable low voltage VD1, the first variable middle voltage VD2, or the first variable high voltage VD3. The second power voltage VSS1 may have the second variable low voltage VS2 or the second variable high voltage VS1. Because the first power voltage VDD1 and the second power voltage VSS1 may be changed, a power consumption of the display apparatus 1 may be reduced. Additionally, because the first power voltage VDD1 and the second power voltage VSS1 may be changed, an emission reliability and an emission stability of the pixel circuit PX may be further improved.

Figure 10:
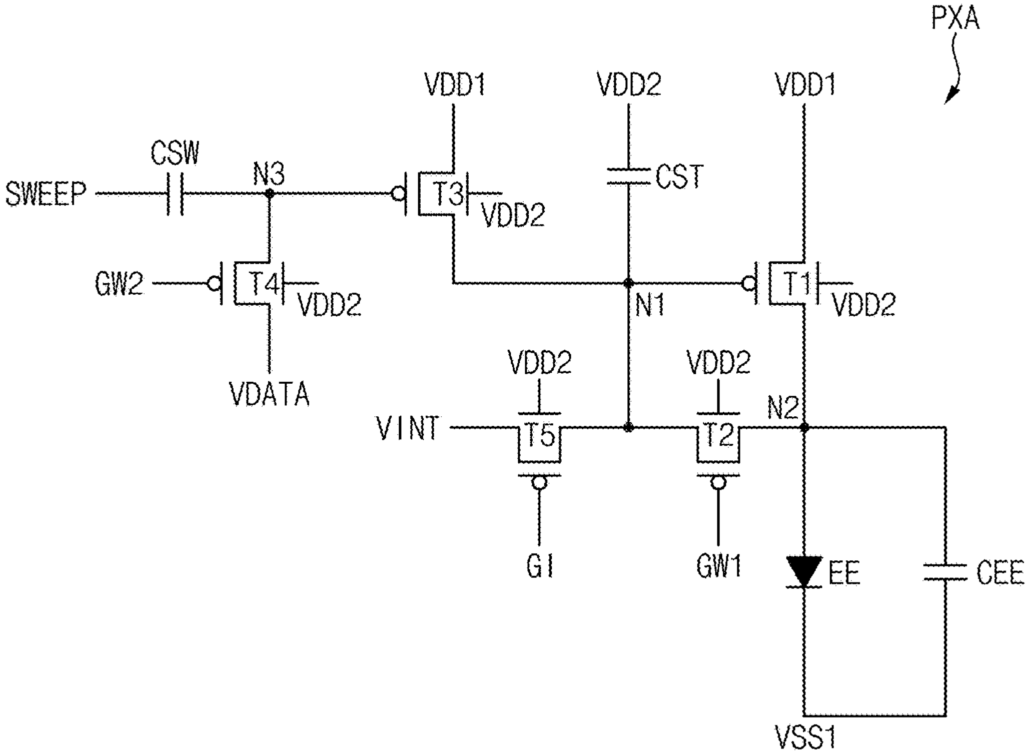
FIG. 10 is a circuit diagram illustrating an example of a pixel circuit included in a display apparatus of FIG. 1.

FIG. 10 is a circuit diagram illustrating an example of a pixel circuit PXA included in a display apparatus 1 of FIG. 1.

Referring to FIG. 10, a pixel circuit PXA may include the first to fifth transistors T1, T2, T3, T4, and T5. The pixel circuit PXA is substantially same as the pixel circuit PX described with referring to FIG. 2 to FIG. 9, except that each of the first to fifth transistors T1, T2, T3, T4, and T5 may further include a second control electrode. Accordingly, the same reference numerals will be used, and any repetitive explanation concerning the above elements will be omitted.

The first transistor T1 may further include a second control electrode for receiving the third power voltage VDD2. The second transistor T2 may further include a second control electrode for receiving the third power voltage VDD2. The third transistor T3 may further include a second control electrode for receiving the third power voltage VDD2. The fourth transistor T4 may further include a second control electrode for receiving the third power voltage VDD2. The fifth transistor T5 may further include a second control electrode for receiving the third power voltage VDD2.

Because each of the first to fifth transistors T1, T2, T3, T4, and T5 may further include a second control electrode for receiving the third power voltage VDD2, a driving stability of the pixel circuit PXA may be further improved.

Figure 11:
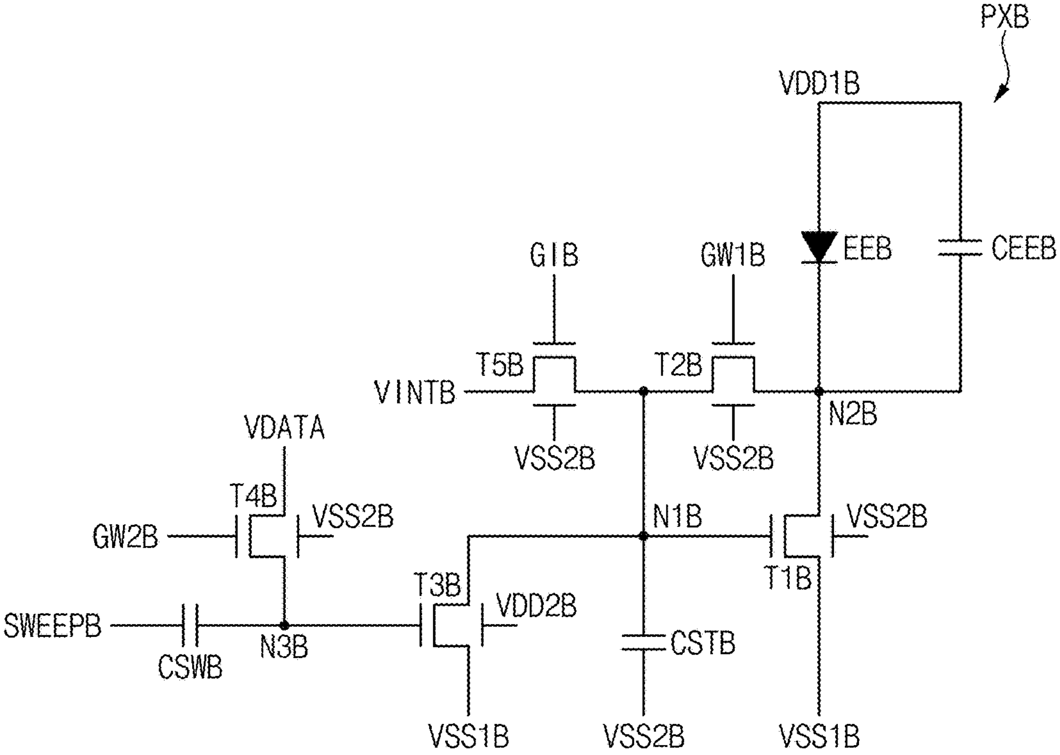
FIG. 11 is a circuit diagram illustrating an example of a pixel circuit included in a display apparatus of FIG. 1.

FIG. 11 is a circuit diagram illustrating an example of a pixel circuit PXB included in a display apparatus 1 of FIG. 1.

Referring to FIG. 1 and FIG. 2, the pixel circuit PX may include a first transistor T1B, a second transistor T2B, a third transistor T3B, a fourth transistor T4B, a fifth transistor T5B, a storage capacitor CSTB, a sweep capacitor CSWB, and a light-emitting element EEB. In one or more embodiments, the pixel circuit PXB may further include a light-emitting element CEEB.

The gate signal may include an initialization gate signal GIB, a fist write gate signal GW1B, and a second write gate signal GW2B.

The first transistor T1B may include a first control electrode connected to a first node N1B, a second control electrode for receiving a third power voltage VSS2B, a first electrode for receiving a first power voltage VSS1B, and a second electrode connected to a second node N2B. The first transistor T1B may apply the first power voltage VSS1B to the second node N2B in response to a voltage of the first node N1B. The first transistor T1B may generate a driving current based on the voltage of the first node N1B. The first transistor T1B may output the driving current to the second node N2B. For example, the first transistor T1B may be called as the driving transistor.

The second transistor T2B may include a first control electrode for receiving the first write gate signal GW1B, a second control electrode for receiving a third power voltage VSS2B, a first electrode connected to the second node N2B, and a second electrode connected to the first node N1B. The second transistor T2B may connect the second node N2B to the first node N1B in response to the first write gate signal GW1B. The second transistor T2B may be diode-connecting the first transistor T1B. For example, the second transistor T2B may be called as the compensation transistor.

The third transistor T3B may include a first control electrode connected to a third node N3B, a second control electrode for receiving a third power voltage VSS2B, a first electrode for receiving the first power voltage VSS1B, and a second electrode connected to the first node N1B. The third transistor T3 may apply the first power voltage VSS1B to the first node N1B in response to a voltage of the third node N3B. For example, the third transistor T3B may be called as the sweep transistor.

The fourth transistor T4B may include a first control electrode for receiving the second write gate signal GW2B, a second control electrode for receiving a third power voltage VSS2B, a first electrode for receiving the data voltage VDATA, and a second electrode connected to the third node N3B. The fourth transistor T4B may apply the data voltage VDATA to the third node N3B in response to the second write gate signal GW2B. For example, the fourth transistor T4B may be called as the write transistor.

The fifth transistor T5B may include a control electrode for receiving the initialization gate signal GIB, a first electrode for receiving an initialization voltage VINTB, and a second electrode connected to the first node N1B. The fifth transistor T5B may apply the initialization voltage VINTB to the first node N1B in response to the initialization gate signal GIB. For example, the fifth transistor T5B may be called as the initialization transistor.

The storage capacitor CSTB may include a first electrode for receiving a third power voltage VSS2B, and a second electrode connected to the first node N1B. The storage capacitor CSTB may store the voltage of the first node N1B. For example, the third power voltage VSS2B may be a DC power voltage.

The sweep capacitor CSWB may include a first electrode for receiving the sweep signal SWEEPB, and a second electrode connected to the third node N3B. The sweep capacitor CSWB may apply the sweep signal SWEEPB to the third node N3B. For example, the sweep capacitor CSWB may couple a change of the sweep signal SWEEPB, and may apply a coupling voltage to the third node N3B.

The light-emitting element EEB may include an anode for receiving a second power voltage VDD1B, and a cathode connected to the second node N2B. The light-emitting element EE may emit light based on the driving current.

In one or more embodiments, the light-emitting element capacitor CEE may include a first electrode connected to the second node N2, and a second electrode for receiving the second power voltage VDD1B. The light-emitting element capacitor may improve a black characteristic of the pixel circuit PX.

The first to fifth transistors T1B, T2B, T3B, T4B, and T5B may be N-type transistors.

Figure 12:
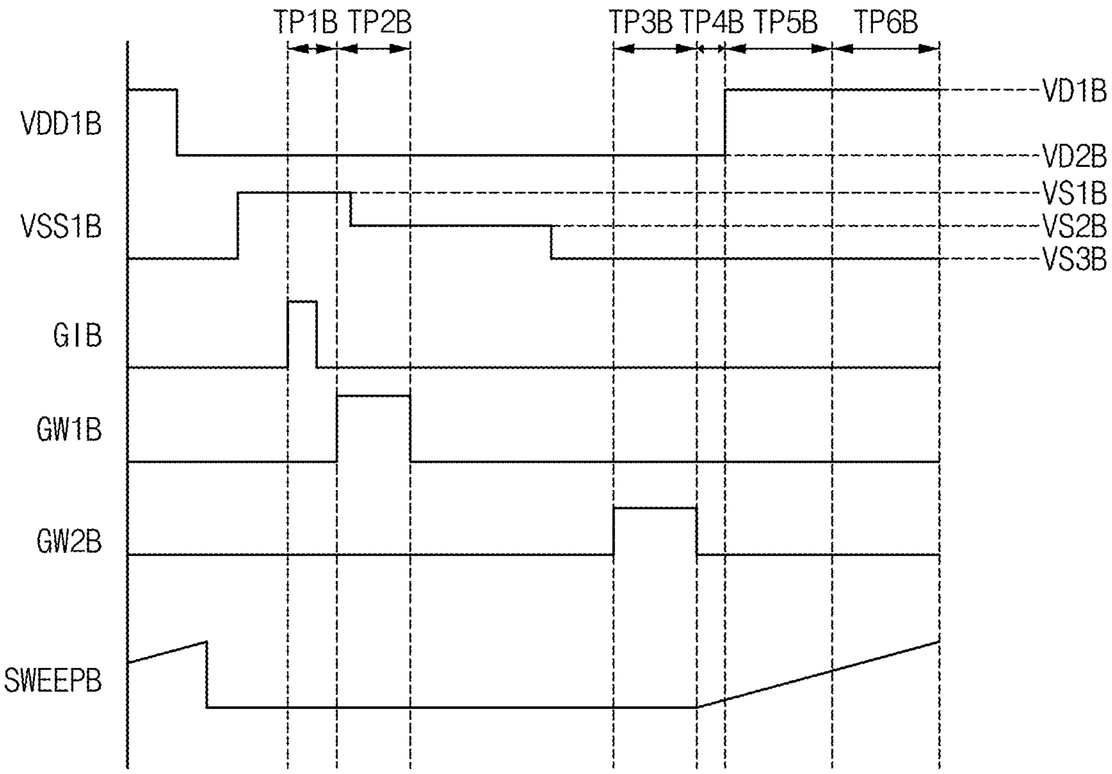
FIG. 12 is a timing diagram illustrating a timing of input signals applied to a pixel circuit of FIG. 1.

FIG. 12 is a timing diagram illustrating a timing of input signals applied to a pixel circuit PXB of FIG. 11.

Referring to FIG. 1, FIG. 11, and FIG. 12, a frame period in which the pixel circuit PXB is driven may include a first period TP1B, a second period TP2B, a third period TP3B, a fourth period TP4B, a fifth period TP5B, and a sixth period TP6B.

The first power voltage VSS1B may have a first variable low voltage VS3B, a first variable middle voltage VS2B, or a first variable high voltage VS1B. The second power voltage VDD1B may have a second variable low voltage VD2B or a second variable high voltage VD1B. The first variable low voltage VS3B may be lower than the first variable middle voltage VS2B. The first variable high voltage VS1B may be higher than the first variable middle voltage VS2B. The second variable low voltage VD2B may be lower than the second variable high voltage VD1B.

Because the first power voltage VSS1B and the second power voltage VDD1B may be changed, a power consumption of the display apparatus 1 may be reduced.

An activation level of the initialization gate signal GIB may be a high level. An inactivation level of the initialization gate signal GIB may be a low level that is lower than the low level. An activation level of the first write gate signal GW1B may be a high level. An inactivation level of the first write gate signal GW1B may be a low level that is lower than the low level. An activation level of the second write gate signal GW2B may be a high level. An inactivation level of the second write gate signal GW2B may be a low level that is lower than the low level.

In the first period TP1B, the first power voltage VSS1B may have the first variable high voltage VS1B, the second power voltage VDD1B may have the second variable low voltage VD2B, the initialization gate signal GIB may have an activation level, the first write gate signal GW1B may have an inactivation level, the second write gate signal GW2B may have an inactivation level, and the sweep signal SWEEPB may have the second sweep level.

In the second period TP2B, the first power voltage VSS1B may have the first variable middle voltage VS2B, the second power voltage VDD1B may have the second variable low voltage VD2B, the initialization gate signal GIB may have an inactivation level, the first write gate signal GW1B may have an activation level, the second write gate signal GW2B may have an inactivation level, and the sweep signal SWEEPB may have the second sweep level.

In the third period TP3B, the first power voltage VSS1B may have the first variable low voltage VS3B, the second power voltage VDD1B may have the second variable low voltage VD2B, the initialization gate signal GIB may have an inactivation level, the first write gate signal GW1B may have an inactivation level, the second write gate signal GW2B may have an activation level, and the sweep signal SWEEPB may have the second sweep level.

In the fourth period TP4B, the first power voltage VSS1B may have the first variable low voltage VS3B, the second power voltage VDD1B may have the second variable low voltage VD2B, the initialization gate signal GIB may have an inactivation level, the first write gate signal GW1B may have an inactivation level, the second write gate signal GW2B may have an inactivation level, and the sweep signal SWEEPB may be increased from the second sweep level to the first sweep level. For example, the sweep signal SWEEPB may be gradually increased from the second sweep level to the first sweep level.

In the fourth period TP4B, the second variable low voltage VD2B may be applied to the anode of the light-emitting element EEB, so that a turned off state of the light-emitting element EEB may be maintained. When the data voltage VDATA corresponding to black is applied to the third node N3B, the sweep signal SWEEPB may be gradually increased, so that the third transistor T3B may be turned on in the fourth period T4B. Because the third transistor T3 may be turned on, the first variable low voltage VS3B may be applied to the first node N1B. Because the first variable low voltage VS3B may be applied to the first node N1B, the first transistor T1B may be turned off. Accordingly, the pixel circuit PXB may stably display black in the fifth period TP5B.

In the fifth period TP5B, the first power voltage VSS1B may have the first variable low voltage VS3B, the second power voltage VDD1B may have the second variable high voltage VD1B, the initialization gate signal GIB may have an inactivation level, the first write gate signal GW1B may have an inactivation level, the second write gate signal GW2B may have an inactivation level, and the sweep signal SWEEPB may be increased to the first sweep level. For example, the sweep signal SWEEPB may be gradually increased to the first sweep level.

In the sixth period TP6B, the first power voltage VSS1B may have the first variable low voltage VS3B, the second power voltage VDD1B may have the second variable high voltage VD1B, the initialization gate signal GIB may have an inactivation level, the first write gate signal GW1B may have an inactivation level, the second write gate signal GW2B may have an inactivation level, and the sweep signal SWEEPB may be increased to the first sweep level. For example, the sweep signal SWEEPB may be gradually increased to the first sweep level.

The pixel circuit PXB may include five transistors and two capacitors. The pixel circuit PXB may be driven by pulse width modulation, may perform an internal compensation of threshold voltage, and may include a small number of transistors compared with conventional pixel circuit, so that the pixel circuit PXB may have a high integration.

Figure 13:
FIG. 13 is a diagram illustrating an example of a pixel circuit of FIG. 2 located on a substrate.

Additionally, the first power voltage VSS1B may have the first variable low voltage VS3B, the first variable middle voltage VS2B, or the first variable high voltage VS1B. The second power voltage VSS1 may have the second variable low voltage VD2B or the second variable high voltage VD1B. Because the first power voltage VSS1B and the second power voltage VDD1B may be changed, a power consumption of the display apparatus 1 may be reduced. Additionally, because the first power voltage VSS1B and the second power voltage VDD1B may be changed, an emission reliability and an emission stability of the pixel circuit PXB may be further improved. FIG. 13 is a diagram illustrating an example of a pixel circuit PX of FIG. 2 located on a substrate 10.

Referring to FIG. 1 to FIG. 9 and FIG. 13, the pixel circuit PX may be located on the substrate 10 (as used herein, "located on" may mean "above"). In one or more embodiments, the substrate 10 may be a silicon-based substrate. In one or more embodiments, the pixel circuit PX may be located on the silicon-based substrate. Because the pixel circuit PX may be located on the silicon-based substrate, the first variable high voltage VD3, the first variable middle voltage VD2, and the first variable low voltage VD1 may be set more precisely. Additionally, because the pixel circuit PX may be located on the silicon-based substrate, the second variable high voltage VS1 and the second variable low voltage VS2 may be set more precisely.

Figure 14:
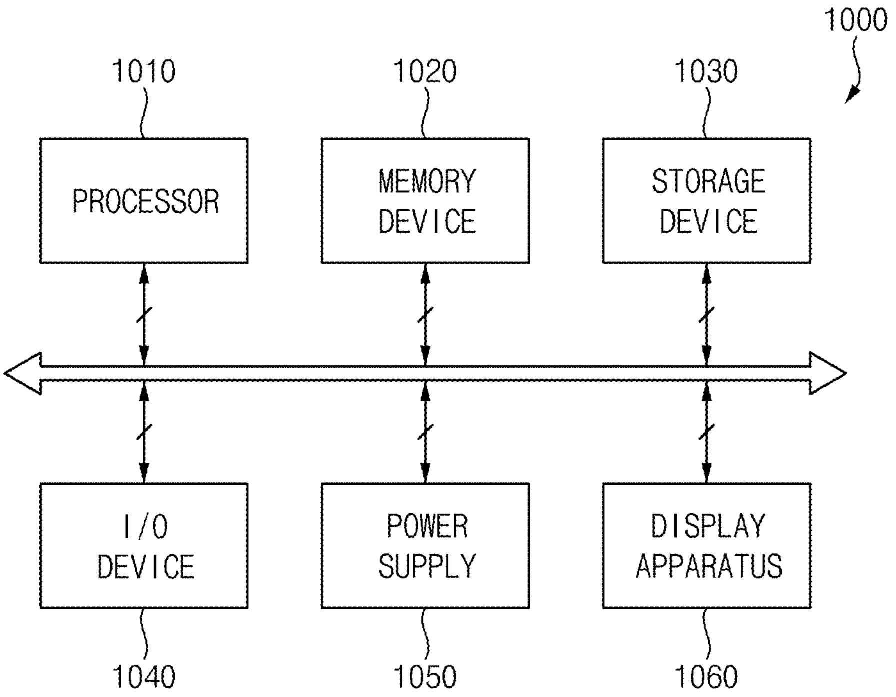
FIG. 14 is a block diagram illustrating an electronic device according to one or more embodiments of the present disclosure.
Figure 15:
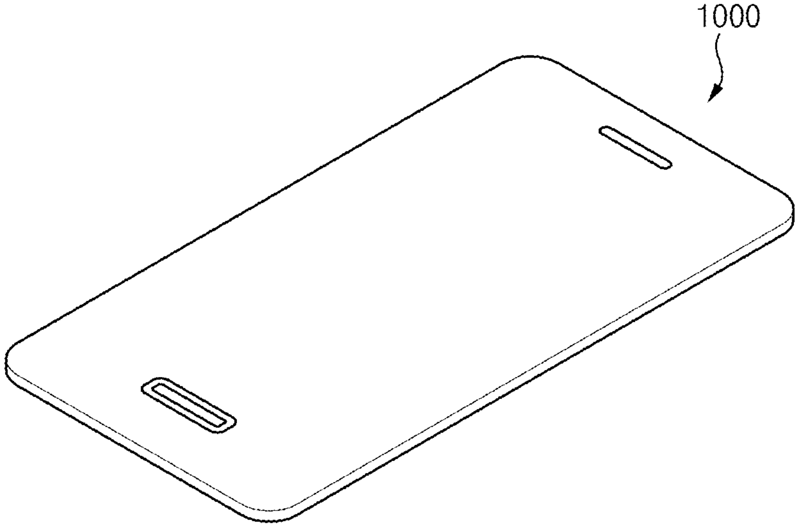
FIG. 15 is a diagram illustrating an example in which the electronic device of FIG. 14 is implemented as a smart phone.

FIG. 14 is a block diagram illustrating an electronic device 1000 according to one or more embodiments of the present disclosure. FIG. 15 is a diagram illustrating an example in which the electronic device of FIG. 14 is implemented as a smart phone.

Referring to FIG. 14, the electronic device 1000 may include a processor 1010, a memory device 1020, a storage device 1030, an input/output (I/O) device 1040, a power supply 1050, and a display apparatus 1060. Here, the display apparatus 1060 may be the display apparatus of FIG. 1. Additionally, the electronic device 1000 may further include a plurality of ports for communicating with a video card, a sound card, a memory card, a universal serial bus (USB) device, other electronic device, etc.

In one or more embodiments, as illustrated in FIG. 15, the electronic device 1000 may be implemented as a smart phone. However, the electronic device 1000 is not limited thereto. For example, the electronic device 1000 may be implemented as a cellular phone, a video phone, a smart pad, a smart watch, a tablet PC, a car navigation system, a computer monitor, a laptop, a head-mounted display (HMD) device, and the like.

The processor 1010 may perform various computing functions or various tasks. The processor 1010 may be a micro-processor, a central processing unit (CPU), an application processor (AP), and the like. The processor 1010 may be coupled to other components via an address bus, a control bus, a data bus, etc. Further, the processor 1010 may be coupled to an extended bus, such as a peripheral component interconnection (PCI) bus.

The processor 1010 may output the input image data IMG, an app-on signal, and/or the input control signal CONT to the driving controller 200 of FIG. 1.

The memory device 1020 may store data for operations of the electronic device 1000. For example, the memory device 1020 may include at least one non-volatile memory device, such as an erasable programmable read-only memory (EPROM) device, an electrically erasable programmable read-only memory (EEPROM) device, a flash memory device, a phase change random access memory (PRAM)

device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc. and/or at least one volatile memory device, such as a dynamic random access memory (DRAM) device, a static random access memory (SRAM) device, a mobile DRAM device, etc.

The storage device 1030 may include a solid state drive (SSD) device, a hard disk drive (HDD) device, a CD-ROM device, and the like. The I/O device 1040 may include an input device, such as a keyboard, a keypad, a mouse device, a touch-pad, a touch-screen, and the like and an output device, such as a printer, a speaker, and the like. In some embodiments, the display apparatus 1060 may be included in the I/O device 1040. The power supply 1050 may provide power for operations of the electronic device 1000. The display apparatus 1060 may be coupled to other components via the buses or other communication links.

Referring to FIG. 15, the electronic device of the present disclosure is shown implemented as a smartphone, but the present disclosure is not limited thereto. The electronic device may be a television, a monitor, a laptop computer, or a tablet. Additionally, the electronic device may be a car.

The display apparatus according to the embodiments may be applied to a display apparatus included in a computer, a notebook, a mobile phone, a smart phone, a smart pad, a PMP, a PDA, an MP3 player, or the like.

The foregoing is illustrative of the present disclosure and is not to be construed as limiting thereof. Although a few embodiments of the present disclosure have been described, those skilled in the art will readily appreciate that many modifications are possible in the embodiments without materially departing from the novel teachings and advantages of the present disclosure. Accordingly, all such modifications are intended to be included within the scope of the present disclosure as defined in the claims. In the claims, means-plus-function clauses are intended to cover the structures described herein as performing the recited function and not only structural equivalents but also equivalent structures. Therefore, it is to be understood that the foregoing is illustrative of the present disclosure and is not to be construed as limited to the specific embodiments disclosed, and that modifications to the disclosed embodiments, as well as other embodiments, are intended to be included within the scope of the appended claims. The present disclosure is defined by the following claims, with equivalents of the claims to be included therein.

What is claimed is:

1. A pixel circuit comprising:

a first transistor configured to apply a driving current to a second node in response to a voltage of first node;

a second transistor configured to connect the first node and the second node in response to a first write gate signal;

a third transistor configured to apply a first power voltage, which is configured to be changed during a frame period in which the pixel circuit is driven, to the first node in response to a voltage of a third node;

a fourth transistor configured to apply a data voltage to the third node in response to a second write gate signal;

a fifth transistor configured to apply an initialization voltage to the first node in response to an initialization gate signal;

a sweep capacitor configured to apply a sweep signal to the third node; and a light-emitting element comprising an anode connected to the second node, and a cathode for receiving a second power voltage.

2. The pixel circuit of claim 1, wherein the first transistor comprises a control electrode connected to the first node, a first electrode for receiving the first power voltage, and a second electrode connected to the second node.

3. The pixel circuit of claim 1, wherein the second power voltage is configured to be changed during the frame period.

4. The pixel circuit of claim 3, wherein, in a first period of the frame period, the first power voltage is configured to have a first variable low voltage, the second power voltage is configured to have a second variable high voltage, the initialization gate signal is configured to have an activation level, and the fifth transistor is configured to be turned on.

5. The pixel circuit of claim 4, wherein, in the first period, the first transistor is configured to be turned off.

6. The pixel circuit of claim 4, wherein, in a second period following the first period, the first power voltage is configured to have a first variable middle voltage that is higher than the first variable low voltage, the first write gate signal is configured to have an activation level, and the second transistor is configured to be turned on.

7. The pixel circuit of claim 6, wherein, in the second period, the first transistor is configured to be turned on.

8. The pixel circuit of claim 6, wherein, in a third period following the second period, the first power voltage is configured to have a first variable high voltage that is higher than the first variable middle voltage, the second write gate signal is configured to have an activation level, and the fourth transistor is configured to be turned on.

9. The pixel circuit of claim 8, wherein, in a fourth period following the third period, the second power voltage is configured to have the second variable high voltage, and a voltage of the sweep signal is configured to be gradually decreased.

10. The pixel circuit of claim 9, wherein, in the fourth period, the first transistor is configured to be turned off.

11. The pixel circuit of claim 8, wherein, in a fifth period following the third period, the second power voltage is configured to have a second variable low voltage that is lower than the second variable high voltage, a voltage of the sweep signal is configured to be gradually decreased, and the first transistor is configured to be turned on.

12. The pixel circuit of claim 11, wherein, in a sixth period following the fifth period, the voltage of the sweep signal is configured to be gradually decreased, the third transistor is configured to be turned, on and the first transistor is configured to be turned off.

13. The pixel circuit of claim 1, further comprising:

an emission capacitor comprising a first electrode connected to the second node, and a second electrode for receiving the second power voltage; and a storage capacitor comprising a first electrode for receiving a third power voltage, and a second electrode connected to the first node.

14. The pixel circuit of claim 1, wherein the first transistor comprises a control electrode connected to the first node, a first electrode for receiving the first power voltage, and a second electrode connected to the second node, wherein the second transistor comprises a control electrode for receiving the first write gate signal, a first electrode connected to the second node, and a second electrode connected to the first node, wherein the third transistor comprises a control electrode connected to the third node, a first electrode for receiving the first power voltage, and a second electrode connected to the first node, wherein the fourth transistor comprises a control electrode for receiving the second write gate signal, a first electrode for receiving the data voltage, and a second electrode connected to the third node, and wherein the fifth transistor comprises a control electrode for receiving the initialization gate signal, a first electrode for receiving the initialization voltage, and a second electrode connected to the first node.

15. The pixel circuit of claim 14, wherein the first transistor, the second transistor, the third transistor, the fourth transistor, and the fifth transistor comprise P-type transistors.

16. A pixel circuit comprising:

a first transistor configured to apply a driving current to a second node in response to a voltage of a first node;

a second transistor configured to connect the first node and the second node in response to a first write gate signal;

a third transistor configured to apply a first power voltage, which is configured to be changed during a frame period in which the pixel circuit is driven, to the first node in response to a voltage of a third node;

a fourth transistor configured to apply a data voltage to the third node in response to a second write gate signal;

a fifth transistor configured to apply an initialization voltage to the first node in response to an initialization gate signal;

a sweep capacitor configured to apply a sweep signal to the third node; and a light-emitting element comprising an anode for receiving a second power voltage, and a cathode connected to the second node.

17. The pixel circuit of claim 16, wherein the first transistor, the second transistor, the third transistor, the fourth transistor, and the fifth transistor comprise N-type transistors.

18. The pixel circuit of claim 16, wherein the frame period comprises a first period, a second period, a third period, a fourth period, and a fifth period, wherein, in the first period, the first power voltage is configured to have a first variable high voltage, the second power voltage is configured to have a second variable low voltage, and the initialization gate signal is configured to have an activation level, wherein, in the second period, the first power voltage has a first variable middle voltage that is lower than the first variable high voltage, and the first write gate signal is configured have an activation level, wherein, in the third period, the first power voltage is configured have a first variable low voltage that is lower than the first variable middle voltage, and the second write gate signal is configured have an activation level, wherein, in the fourth period, the first power voltage is configured have the first variable low voltage, and a voltage of the sweep signal is configured to be gradually increased, and wherein, in the fifth period, the second power voltage is configured have a second variable high voltage that is higher than the second variable low voltage, and the voltage of the sweep signal is configured to be gradually increased.

19. A display apparatus comprising:

a gate driver configured to apply an initialization gate signal, a first write gate signal, and a second write gate signal;

a display panel comprising a pixel circuit comprising:

a first transistor configured to apply a driving current to a second node in response to a voltage of first node;

a second transistor configured to connect the first node and the second node in response to the first write gate signal;

a third transistor configured to apply a first power voltage, which is configured to be changed during a frame period in which the pixel circuit is driven, to the first node in response to a voltage of a third node;

a fourth transistor configured to apply a data voltage to the third node in response to the second write gate signal;

a fifth transistor configured to apply an initialization voltage to the first node in response to the initialization gate signal;

a sweep capacitor configured to apply a sweep signal to the third node; and a light-emitting element comprising an anode connected to the second node, and a cathode for receiving a second power voltage; and a data driver configured to apply a data voltage to the display panel.

20. The display apparatus of claim 19, wherein the frame period comprises a first period, a second period, a third period, a fourth period, and a fifth period, wherein, in the first period, the first power voltage is configured have a first variable low voltage, the second power voltage is configured have a second variable high voltage, and the initialization gate signal is configured have an activation level, wherein, in the second period following the first period, the first power voltage is configured have a first variable middle voltage that is higher than the first variable low voltage, and the first write gate signal is configured have an activation level, wherein, in the third period following the second period, the first power voltage is configured have a first variable high voltage that is higher than the first variable middle voltage, and the second write gate signal is configured have an activation level, wherein, in the fourth period following the third period, the second power voltage is configured have the second variable high voltage, and a voltage of the sweep signal is configured to be gradually decreased, and wherein, in the fifth period following the fourth period, the second power voltage is configured have a second variable low voltage that is lower than the second variable high voltage, and the voltage of the sweep signal is configured to be gradually decreased.

21. An electronic device comprising a display apparatus comprising:

a gate driver configured to apply an initialization gate signal, a first write gate signal, and a second write gate signal;

a display panel comprising a pixel circuit comprising:

a first transistor configured to apply a driving current to a second node in response to a voltage of first node;

a second transistor configured to connect the first node and the second node in response to the first write gate signal;

a third transistor configured to apply a first power voltage, which is configured to be changed during a frame period in which the pixel circuit is driven, to the first node in response to a voltage of a third node;
a fourth transistor configured to apply a data voltage to the third node in response to the second write gate signal;
a fifth transistor configured to apply an initialization voltage to the first node in response to the initialization gate signal;
a sweep capacitor configured to apply a sweep signal to the third node; and
a light-emitting element comprising an anode connected to the second node, and a cathode for receiving a second power voltage; and
a data driver configured to apply a data voltage to the display panel.

22. The electronic device of claim 21, wherein the electronic device comprises a smartphone, a television, a monitor, a tablet, an electric vehicle, a mobile phone, a tablet personal computer (PC), a mobile communication terminal, an electronic notebook, an electronic book, a portable multimedia player (PMP), a navigation device, an ultra-mobile PC (UMPC), a laptop computer, a billboard, an Internet of Things (IoT) device, a smartwatch, a watch phone, or a head-mounted display (HMD).

* * * * *